US008866900B2

(12) United States Patent
Sohma et al.

(10) Patent No.: US 8,866,900 B2
(45) Date of Patent: Oct. 21, 2014

(54) INFORMATION PROCESSING APPARATUS AND METHOD OF CONTROLLING SAME

(75) Inventors: Hidetomo Sohma, Yokohama (JP); Hiroshi Tojo, Fuchu (JP); Satoshi Yashiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 447 days.

(21) Appl. No.: 12/613,052

(22) Filed: Nov. 5, 2009

(65) Prior Publication Data
US 2010/0118205 A1    May 13, 2010

(30) Foreign Application Priority Data
Nov. 12, 2008   (JP) ................................. 2008-290322

(51) Int. Cl.
H04N 9/47   (2006.01)
H04N 7/18   (2006.01)
H04N 5/14   (2006.01)
H04N 9/64   (2006.01)
G06T 7/20   (2006.01)
G06K 9/00   (2006.01)

(52) U.S. Cl.
CPC .............. *H04N 5/147* (2013.01); *G06T 7/204* (2013.01); *G06K 9/00228* (2013.01); *G06T 2207/10016* (2013.01); *G06T 2207/30201* (2013.01)
USPC .......................................... 348/135; 348/700

(58) Field of Classification Search
None
See application file for complete search history.

(56) References Cited

U.S. PATENT DOCUMENTS

| 6,728,473 B1 | 4/2004 | Chotoku et al. |
| 6,965,701 B2 | 11/2005 | Tojo ............................. 382/239 |
| 7,038,736 B2 | 5/2006 | Tojo ............................. 348/700 |

(Continued)

FOREIGN PATENT DOCUMENTS

| JP | 09-219835 A | 8/1997 |
| JP | 2000-232638 A | 8/2000 |

(Continued)

OTHER PUBLICATIONS

Henry A. Rowley, et al., "Neural Network-Based Face Detection", IEEE Transactions on Pattern Analysis and Machine Intelligence, vol. 20, No. 1, Jan. 1998, pp. 1-28.

(Continued)

Primary Examiner — Joseph Ustaris
Assistant Examiner — Kevin McInnish
(74) Attorney, Agent, or Firm — Fitzpatrick, Cella, Harper & Scinto (57) ABSTRACT

An information processing apparatus for extracting a more appropriate representative frame image from moving image data that includes a plurality of frames of image data arranged in a time series includes: an input unit configured to input moving image data; a detecting unit configured to detect a frame image, which includes an image similar to a prescribed image pattern; a tracking unit configured to detect a frame image, which includes an image similar to the image included in the detected frame image; a storage unit configured to store the successive frame images in association with time information; a splitting unit configured to split the moving image data into a plurality of time intervals with starting time and end time of each of one or more image sequences; and an extracting unit configured to extract a representative frame image.

6 Claims, 10 Drawing Sheets

(56) References Cited

U.S. PATENT DOCUMENTS

| | | |
|---|---|---|
| 7,051,048 B2 | 5/2006 | Sohma et al. |
| 7,123,264 B2 | 10/2006 | Tojo et al. .................... 345/474 |
| 7,145,684 B2 | 12/2006 | Tojo ............................. 358/1.16 |
| 7,155,064 B2 | 12/2006 | Tojo ............................. 382/239 |
| 7,170,935 B2 | 1/2007 | Tojo |
| 7,269,290 B2 | 9/2007 | Tojo ............................. 382/239 |
| 7,391,436 B2 | 6/2008 | Tojo ......................... 348/207.99 |
| 7,466,365 B2 | 12/2008 | Tojo ............................. 348/700 |
| 7,720,369 B2 | 5/2010 | Nose |
| 8,254,771 B2 | 8/2012 | Nose |
| 8,270,806 B2 | 9/2012 | Yashiro et al. |
| 2002/0114615 A1 | 8/2002 | Tojo et al. |
| 2003/0234866 A1 | 12/2003 | Cutler ......................... 348/207.1 |
| 2004/0263611 A1 | 12/2004 | Cutler ............................. 348/36 |
| 2005/0046703 A1 | 3/2005 | Cutler ......................... 348/223.1 |
| 2005/0117015 A1 | 6/2005 | Cutler ............................. 348/38 |
| 2005/0117034 A1 | 6/2005 | Cutler ........................... 348/239 |
| 2005/0151837 A1 | 7/2005 | Cutler ............................. 348/36 |
| 2005/0285943 A1 | 12/2005 | Cutler ......................... 348/207.1 |
| 2006/0023074 A1 | 2/2006 | Cutler ......................... 348/218.1 |
| 2006/0023075 A1 | 2/2006 | Cutler ......................... 348/218.1 |
| 2006/0083443 A1 | 4/2006 | Tojo |
| 2006/0122986 A1 | 6/2006 | Sohma |
| 2006/0132853 A1 | 6/2006 | Tojo ........................... 358/26.05 |
| 2006/0268131 A1 | 11/2006 | Cutler ........................... 348/239 |
| 2007/0024710 A1* | 2/2007 | Nakamura ................... 348/143 |
| 2007/0285579 A1 | 12/2007 | Hirai et al. |
| 2008/0144890 A1 | 6/2008 | Ogawa |
| 2008/0205869 A1 | 8/2008 | Nose |
| 2008/0231757 A1 | 9/2008 | Tojo ............................. 348/700 |
| 2008/0247675 A1 | 10/2008 | Magai et al. |
| 2008/0260255 A1* | 10/2008 | Fukushima et al. .......... 382/190 |
| 2008/0285855 A1 | 11/2008 | Shiiyama et al. |
| 2008/0304753 A1 | 12/2008 | Sohma et al. |
| 2010/0104266 A1 | 4/2010 | Yashiro et al. |
| 2010/0194927 A1 | 8/2010 | Nose |

FOREIGN PATENT DOCUMENTS

| | | |
|---|---|---|
| JP | 2001-167110 | 6/2001 |
| JP | 2002-223412 | 8/2002 |
| JP | 3312105 B2 | 8/2002 |
| JP | 2003-348528 A | 12/2003 |
| JP | 2005-101906 | 4/2005 |
| JP | 2005-227957 A | 8/2005 |
| JP | 2006-129480 | 5/2006 |
| JP | 2007-094990 A | 4/2007 |
| JP | 2008-211485 A | 9/2008 |

OTHER PUBLICATIONS

Ming-Hsuan Yang, et al., "Detecting Faces in Images: A Survey", IEEE Transactions on Pattern Analysis and Machine Intelligence, vol. 24, No. 1, Jan. 2002, pp. 34-58.

Matthew Turk, et al., "Eigenfaces for Recognition", Journal of Cognitive Neuroscience, vol. 3, No. 1, 1991, pp. 71-86.

* cited by examiner

| SEQUENCE NO. | STARTING TIME | LENGTH |
|---|---|---|
| 1 | 43.50 | 2.83 |
| 2 | 55.34 | 12.58 |
| 3 | 58.35 | 14.33 |
| 4 | 96.24 | 8.73 |
| 5 | 105.13 | 6.24 |
| 6 | 119.15 | 19.52 |
| 7 | 131.45 | 2.30 |
| 8 | 158.83 | 13.5 |
| ... | ... | ... |

| CONSTANT MAKEUP INTERVAL NO. | COMPOSITION TEMPLATE NO. | REPRESENTATIVE FRAME CANDIDATE POSITION | REPRESENTATIVE FRAME CANDIDATE EVALUATION VALUE | APPEARING PERSONS |
|---|---|---|---|---|
| 1 | 1 | 2.1 | 0.42 | A |
| 2 | 2 | 4.2 | 0.82 | A, B |
| 3 | 1 | 5.4 | 0.55 | B |
| 4 | 2 | 9.3 | 0.90 | B, C |
| 5 | NONE | NONE | NONE | NONE |

FIG. 15

| REPRESENTATIVE FRAME EXTRACTION POSITION CANDIDATE NO. | CONSTANT MAKEUP INTERVAL NO. | NUMBER OF CONSTANT MAKEUP INTERVALS | TOTAL OF EVALUATION VALUES OF REPRESENTATIVE FRAME CANDIDATES | REPRESENTATIVE FRAME CANDIDATE POSITION |
|---|---|---|---|---|
| 1 | 1, 2, 4 | 3 | × | × |
| 2 | 1, 3, 4 | 3 | × | × |
| 3 | 1, 4 | 2 | 1.32 | × |
| 4 | 2, 4 | 2 | 1.72 | 4.2, 9.3 |

INFORMATION PROCESSING APPARATUS AND METHOD OF CONTROLLING SAME

BACKGROUND OF THE INVENTION

1. Field of the Invention

The present invention relates to a technique for extracting a representative frame, which straightforwardly represents video contained in moving image data, from the moving image data.

2. Description of the Related Art

The widespread use of digital cameras and digital video camcorders, or the like, in recent years has made it possible for large quantities of still images and moving images to be captured even by individuals. Since moving image data generally involves an enormous amount of data and includes a time axis unlike the case with still images, it is difficult to ascertain the content of such data in simple fashion. Consequently, if the user wishes to ascertain an overview of content or searches for a desired scene, the user operates the apparatus to perform a fast-forward or fast-rewind operation. Accordingly, in order to ascertain the content of a moving image in a short period of time, a technique relating to extraction of a representative frame has been proposed for selecting an appropriate frame, which well represents the content of the moving image, from a frame within the moving image, and handling the selected frame as information indicating the content of the moving image.

There is a growing tendency for digital cameras purchased for use in the ordinary home to be used for recording domestic events and happenings such as for recording the growth of children. Often, therefore, the subject shot using such a camera is a person.

Accordingly, if it is desired to ascertain the content of a moving image in home video, it is very important that a frame in the moving image that is selected as a representative image be one that makes known information as to who appears in the image. Further, since a domestic event or happening, or the like, is the main theme, if a plurality of persons appear, it is preferred to have information indicating that these persons appear simultaneously.

The specification of Japanese Patent Laid-Open No. 2005-101906 (Patent Document 1) discloses a technique which directs attention toward persons who appear in a moving image and splits the scenes of the moving image if the makeup of the persons that appear changes. When this is done, information indicating the makeup of the persons is assigned to each scene and this information is indexed. By utilizing this information indicating the makeup of the persons, a scene can be searched for and retrieved.

Further, the specification of Japanese Patent No. 3312105 (Patent Document 2) discloses a representative frame extraction technique that is based upon the statistical features of an object. Specifically, the image of an object desired to be detected is learned in advance, an evaluation value is found using a dictionary on a per-object basis by a prescribed method, and a moving image index is generated based upon the evaluation value of each object obtained frame by frame. Furthermore, the specification of Japanese Patent Laid-Open No. 2006-129480 (Patent Document 3) discloses a technique that correlates and utilizes the image of a face a speaking individual who is the object of image capture during a conference and the time interval (timeline) of the spoken voice information.

However, with the technique described in Patent Document 1, face detection is performed frame by frame and a representative image is extracted based solely upon the result. In a case where the subject is moving, however, there is a possibility the face detection will fail. In other words, since the face is not always pointed toward the camera, there are instances where a person cannot be detected even if the person is present as the subject. Such a phenomenon is conspicuous especially in a case where a child is the subject. Further, this phenomenon occurs comparatively often as when there is a plurality of subjects and the subjects are talking to each other. As a result, even if the same person is being captured continuously, when this person fails to be detected, it is determined that the makeup up individuals has changed and a problem which arises is that a representative frame is created a number of times for one and the same appearing person.

Further, since only an evaluation value per frame is used, if a person appears large in the center of a frame even momentarily even though the person is not the main person, the evaluation value rises and this frame happens to be extracted as the representative image. Further, a large number of similar representative frames are extracted and redundancy occurs if these are adopted as indices. Furthermore, since a case where shooting intervals involving a plurality of persons overlap each other is not considered, two representative images are extracted from a scene such as one in which two persons are conversing, and the representative images are redundant. Moreover, since only a face region is cut from the image, a situation in which two people are conversing cannot be ascertained. As a result, there are cases where the user can no longer grasp the content of a moving image appropriately.

SUMMARY OF THE INVENTION

According to one aspect of the present invention, an information processing apparatus comprises: an input unit configured to input moving image data that includes a plurality of frame images arranged in a time series; a detecting unit configured to detect a frame image, which includes an image similar to a prescribed image pattern, from moving image data that has been input; a tracking unit configured to detect a frame image, which includes an image similar to the image included in the frame image detected by the detecting unit, from frame images before and after the detected frame image; a storage unit configured to decide upon successive frame images, which have been detected by the tracking unit, as an image sequence and to store the successive frame images in association with time information in the moving image data corresponding to the image sequence; a splitting unit configured to split the moving image data into a plurality of time intervals with starting time and end time of each of one or more image sequences that have been stored in the storage unit serving as splitting timings; and an extracting unit configured to extract a representative frame image with regard to each of the plurality of time intervals.

According to another aspect of the present invention, a method of controlling an information processing apparatus for extracting one or more representative frame images from moving image data that includes a plurality of frame images arranged in a time series, the method comprises: an input step of inputting moving image data; a detecting step of detecting a frame image, which includes an image similar to a prescribed image pattern, from moving image data that has been input; a tracking step of detecting a frame image, which includes an image similar to the image included in the frame image detected at the detecting step, from frame images before and after the detected frame image; a storage step of deciding upon successive frame images, which have been detected at the tracking step, as an image sequence and storing the successive frame images in a storage unit in association with time information in the moving image data corresponding to the image sequence; a splitting step of splitting the moving image data into a plurality of time intervals with starting time and end time of each of one or more image sequences that have been stored in the storage unit serving as splitting timings; and an extracting step of extracting a representative frame image with regard to each of the plurality of time intervals.

The present invention provides a technique that makes it possible to extract a representative frame image, which expresses the content of moving image data more appropriately, from the moving image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail with reference to the drawings. It should be noted that the embodiments below are merely for illustrative purposes and do not constitute gist that limits the scope of the invention.

First Embodiment

<Overview>

In a first embodiment, a method is described in which face images are searched for and retrieved from moving image data and representative frame images are selected based upon time intervals in which individual persons appear and combinations of the persons.

Apparatus Configuration>

Figure 1:
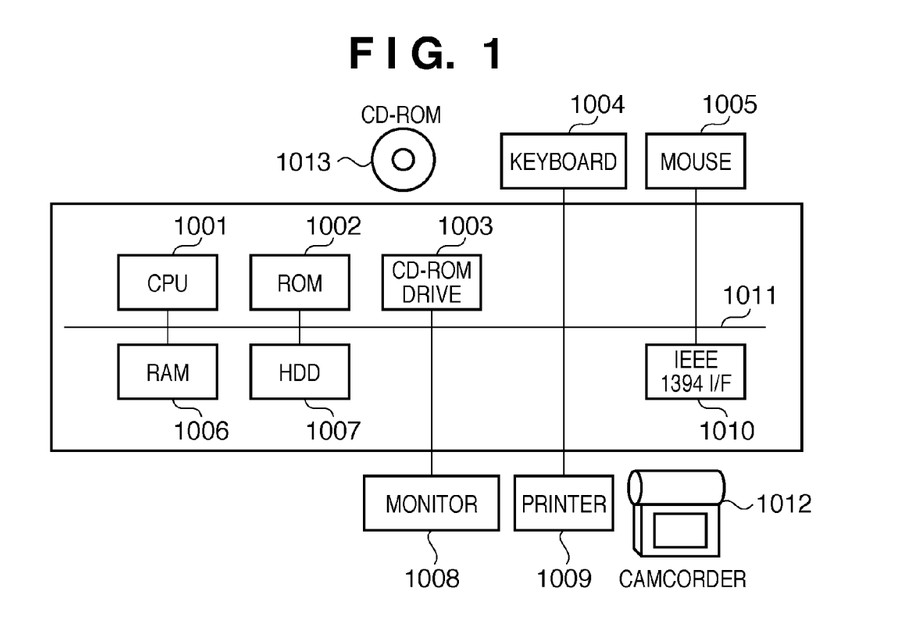
FIG. 1 is a diagram illustrating the internal configuration of an information processing apparatus according to a first embodiment of the present invention.

FIG. 1 is a diagram illustrating the internal configuration of an information processing apparatus according to a first embodiment of the present invention.

The information processing apparatus includes a CPU 1001, a ROM 1002, a CD-ROM drive 1003, a RAM 1006, a hard-disk drive (HDD) 1007 and an IEEE-1394 interface (I/F) 1010. These units are connected via a system bus 1011 so as to be capable of communicating. A keyboard 1004, a mouse 1005, a monitor 1008 and a printer 1009 are connected to the information processing apparatus as a user interface.

The CPU 1001 controls the overall operation of the information processing apparatus, reads out a processing program that has been stored beforehand in the ROM 1002, or the like, and executes the program to thereby implement functional units described later with reference to FIG. 2. The ROM 1002 stores a program, or the like, which, by being executed by the CPU 1001, performs control operations described later. The RAM 1006 stores temporary data such as face sequence information described later. The CD-ROM drive 1003 reads a control program, which has been stored on a CD-ROM 1013, and can store this control program in the RAM 1006. Moving image data that has been read from a camcorder 1012 is stored on the hard-disk drive 1007 via the IEEE-1394 interface 1010.

In the description that follows, it is assumed that the information processing apparatus and camcorder 1012 are connected via the IEEE-1394 interface 1010 and are capable of communicating with each other.

Figure 2:
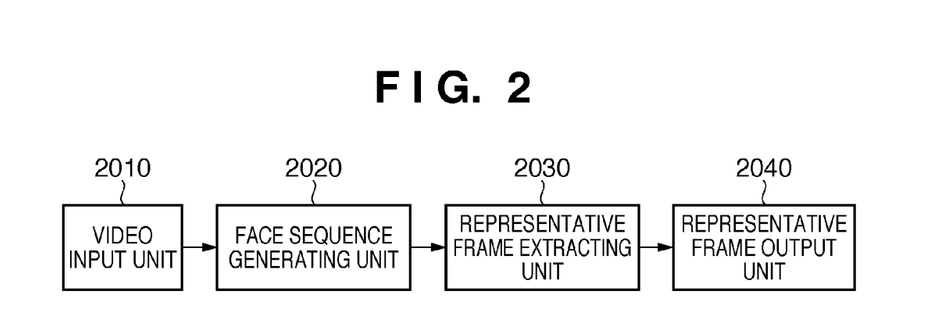
FIG. 2 is a functional block diagram of the information processing apparatus according to the first embodiment.
Figure 3:
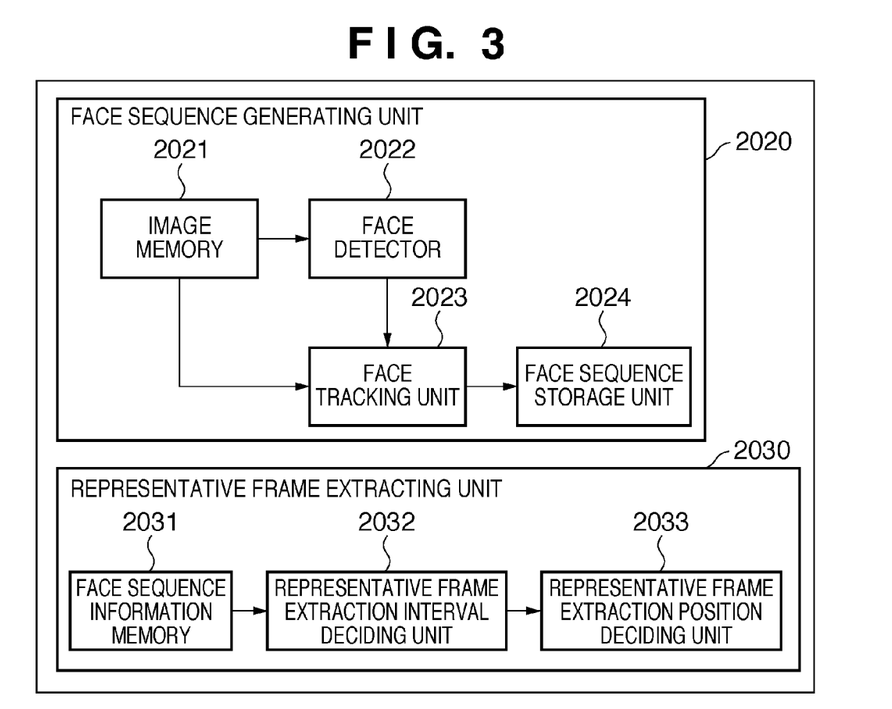
FIG. 3 is a diagram illustrating detailed functional blocks within functional units.

FIG. 2 is a functional block diagram of the information processing apparatus according to the first embodiment. FIG. 3 is a diagram illustrating detailed functional blocks within functional units.

A video input unit 2010 inputs information concerning moving image data as video that is input from the camcorder 1012 via the IEEE-1394 interface 1010. If the video input unit 2010 is capable of reading in moving image data, it may just as well be any interface device. It should be noted that the moving image data includes a plurality of frame images arranged in a time series.

A face sequence generating unit 2020 analyzes video that has been input by the video input unit 2010, extracts a face image from each of the frames in a video interval in which the face appears and outputs a face sequence (image sequence). Here a "face sequence" refers to face images that have been extracted from a continuous video interval and a collection of auxiliary information thereof. Examples of the auxiliary information are the time position of a frame in which a face image was extracted and the region from which the face was cut in the frame, or the like.

The face sequence generating unit 2020 is constituted by an image memory 2021, a face detector 2022, a face tracking unit 2023 and a face sequence storage unit 2024. The image memory 2021 stores moving image data, which has been output from the video input unit 2010, in the RAM 1006 temporarily frame by frame. The face detector 220 performs detection of a face pattern from a prescribed frame of the moving image data and outputs the result of detection. The image data that has been read in is two-dimensional array data and is composed of the three colors red (R), green (G), and blue (B) each of which is composed of 8-bit pixels, by way of example. If the image data has been compressed as by the MPEG or JPEG encoding scheme, then the image data is decompressed in accordance with the corresponding decompression scheme and is made image data composed of RGB pixels.

The face detector 2022 detects a face pattern from a prescribed frame of the moving image data and outputs the result of detection. That is, the face detector 2022 performs face detection from each frame at prescribed frame intervals of the moving image data. Here a case where a method of detecting a face pattern in an image using a neural network proposed by Reference Document 1 is applied will be described.

First, image data that is to undergo face detection is read into memory and a prescribed region to be compared with a face is cut from the image that has been read in. With a distribution of pixel values of the extracted region serving as an input, a single output is obtained via an operation performed by a neural network. The weighting and threshold value of the neural network have been learned beforehand, based upon a large quantity of face image patterns and non-face image patterns. For example, if the output of the neural network is zero or greater, then the extracted region is determined to be a face; otherwise, it is determined not to be a face.

Figure 4:
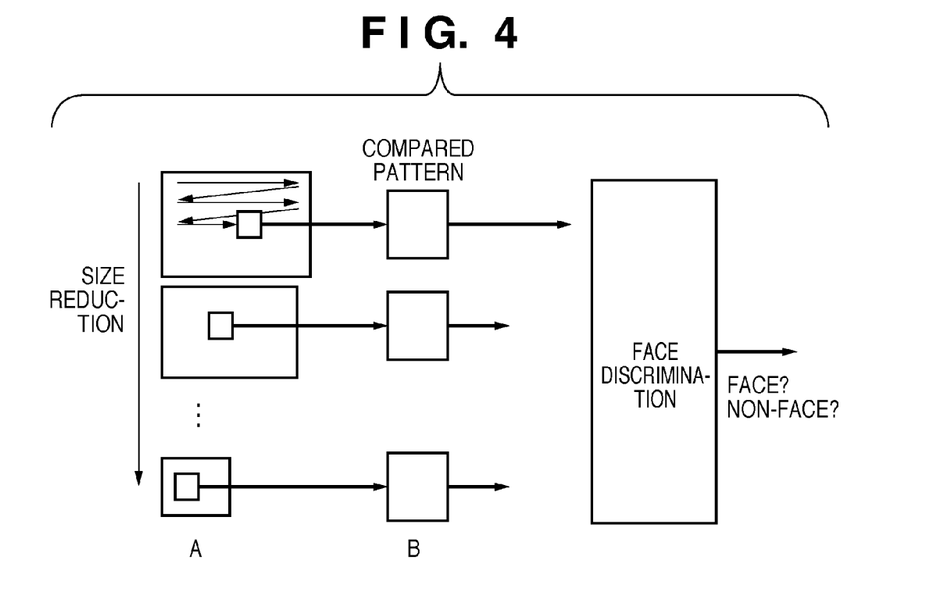
FIG. 4 is a diagram exemplifying the manner in which a face is detected from within an image by a method using a neural network.

FIG. 4 is a diagram exemplifying the manner in which a face is detected from within an image by a method using a neural network. In particular, FIG. 9 illustrates the manner in which the cutting position of an image pattern compared with a face which is the input of the neural network is scanned sequentially vertically and horizontally across the full image. In order to deal with detection of faces of various sizes, it is ideal to adopt an arrangement in which the image that has been read in is reduced in size successively at a prescribed ratio, as illustrated in FIG. 4, and the above-mentioned scanning for face detection is performed with regard to each reduced image.

It should be noted that the method of detecting a face from an image is not limited to the method using the neural network described above. For example, it is possible to apply the various schemes mentioned in Reference Document 2.

Reference Document 1: Rowley et al, "Neural network-based face detection", IEEE TRANSACTIONS ON PATTERN ANALYSIS AND MACHINE INTELLIGENCE, VOL. 20, NO. 1, JANUARY 1998

Reference Document 2: Yang et al, "Detecting Faces in Images: A Survey", IEEE TRANSACTIONS ON PATTERN ANALYSIS AND MACHINE INTELLIGENCE, VOL. 24, NO. 1, JANUARY 2002

The face tracking unit 2023 searches for a face pattern, which has been detected by the face detector 2022, from succeeding frames and outputs face-region information and a face-sequence interval from the tracking data. It may be arranged so that a search is conducted targeted on a preceding frame and not just a succeeding frame.

Figure 5:
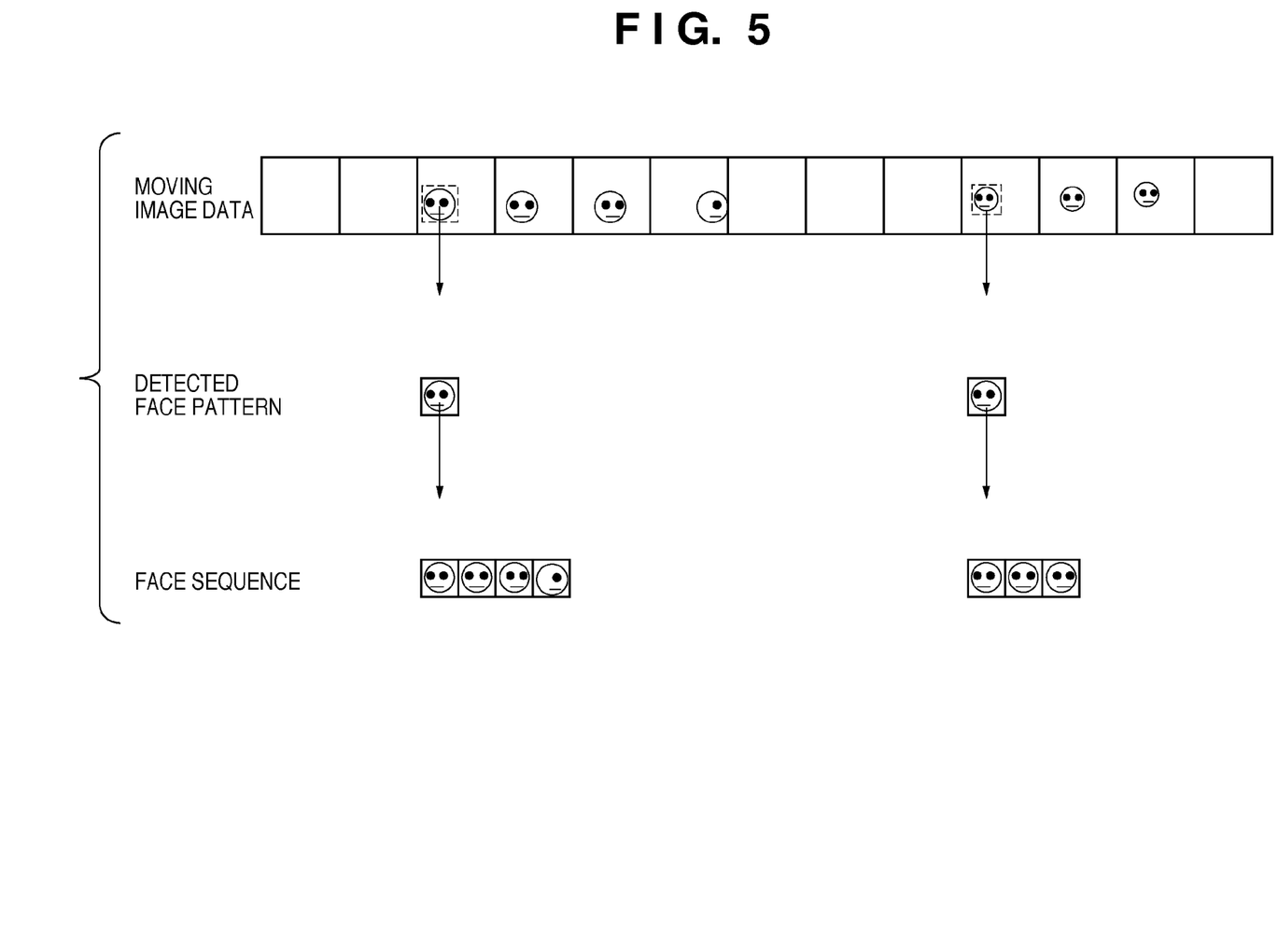
FIG. 5 is a diagram exemplifying the manner in which a face sequence is generated from moving image data.

FIG. 5 is a diagram exemplifying the manner in which a face sequence is generated from moving image data.

As a result of face detection, a face is detected in a frame at prescribed intervals of the moving image data, as illustrated in FIG. 5. As a result, a rectangular image pattern that has been cut from the frame is extracted as a face image. Tracking is performed in succeeding frames with regard to each of the face images that have been detected, and the result is output as a face sequence. Also output at this time in associated form is auxiliary information such as time information (time position) of a frame, in which a face was extracted, in the moving image data, and information about the region in which the face image in the frame was cut.

<Operation of Apparatus>

Processing for Detecting a Face Sequence

Figure 6:
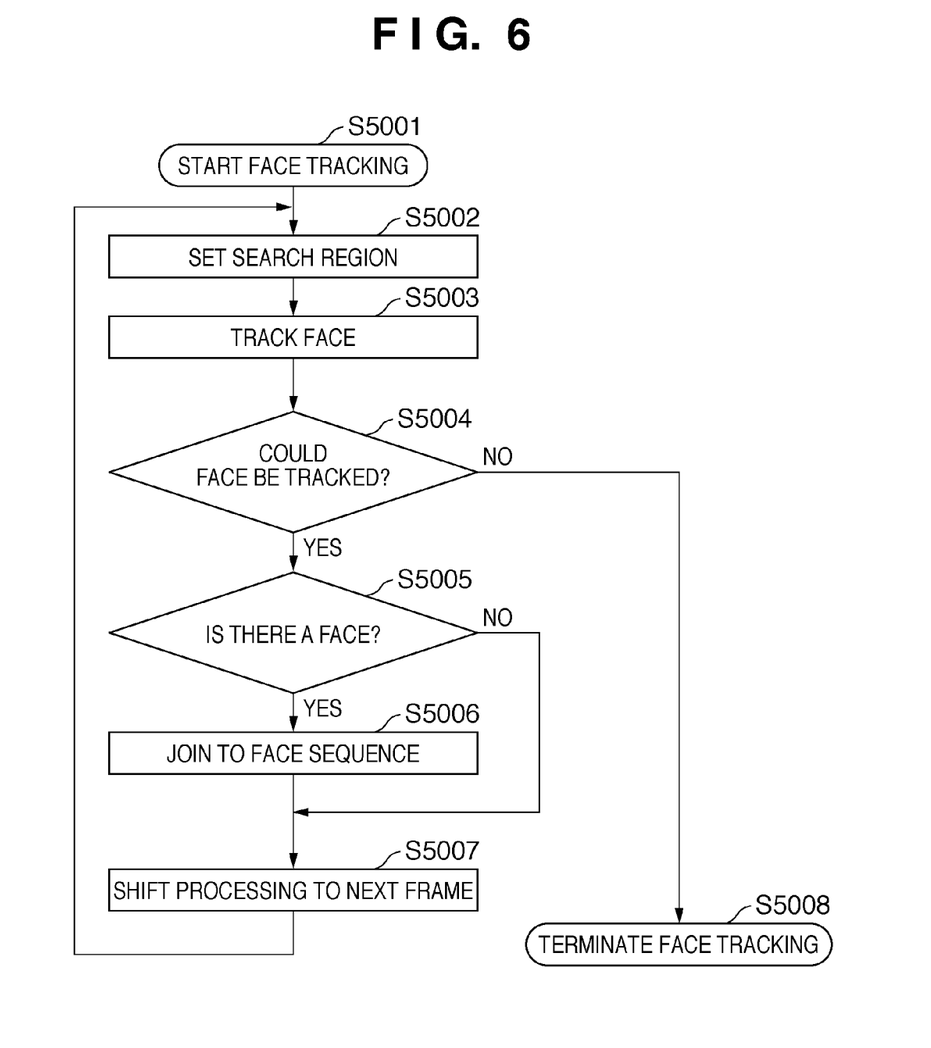
FIG. 6 is a flowchart for detecting a face sequence.

FIG. 6 is a flowchart for detecting a face sequence. This corresponds to the operation of the face tracking unit 2023.

Processing is started in step S5001. First, in step S5002, a search region for conducting a search for a face pattern in a succeeding frame is set based upon region information of the face pattern. In a case where a search is conducted from a frame that follows a frame in which a face has been detected by the face detector 2022, a rectangular area obtained by shifting the center position of a face region prescribed amounts with regard to horizontal and vertical positions relative to the face region, which is the result of face detection, is adopted as a search zone. In a case where the search is conducted in a further succeeding frame, a face region, which is the result of face tracking, is utilized in a similar manner.

In step S5003, face tracking is performed based upon the correlation between the area cut out in the search region and the face pattern searched. For example, rectangular areas having the same size as the face pattern to be searched are cut out successively centered on the center position set as the search region, and correlation values are calculated using, as a template, a luminance distribution of the cut-out area and the face pattern to be searched. A region having a high correlation value is output, together with the correlation value, as the face-pattern tracking result. Although correlation values of a luminance distribution are used here in order to track a face pattern, correlation of a pixel-value distribution of each of the colors R, G, and B may be used, by way of example. Further, a correlation of image features, such as a luminance distribution within a region or a histogram of RGB values, may be used.

In step S5004, it is determined whether a face could be tracked based upon whether a correlation value that has been output by face tracking processing is greater than or equal to a prescribed value. If the correlation value is greater than or equal to the prescribed value, there is a high degree of similarity and therefore it is determined that the face could be tracked accurately. Control proceeds to step S5005 in such a case. If the correlation value is less than the prescribed value, then there is little similarity and therefore it is determined that the face could not be tracked. Face tracking is terminated in this case (S5008).

In step S5005, it is determined whether there is a face image at the tracked destination. Control proceeds to step S5006 if there is a face and to step S5007 if there is no face.

In step S5006, the face image detected in step S5005 is regarded as the face currently being tracked and is joined to the face sequence. At this time a similarity of face-information may be calculated and a determination as to whether the face image and face sequence should be joined or not may be made.

In step S5007, the frame to undergo face tracking is changed to the succeeding frame and control returns to step S5002. A face sequence for every detected face is obtained by repeatedly executing the above-described processing.

It has been described above that a face pattern is searched for and tracked from a succeeding frame for every face pattern has been detected by the face detector 2022. However, an arrangement may be adopted in which a face pattern is searched for and tracked adopting as the target a frame image preceding a frame image in which a face pattern has been detected. In addition, an arrangement may be adopted in which a motion vector distribution is obtained from a moving image and face tracking is performed based upon this motion vector distribution.

In order to prevent a face sequence from being excessively split in a case where something passes by in front of the face or in a case where there is the influence of a flash or the like, face tracking may be carried out using frames spaced apart by a prescribed time interval. Further, a correlation of face features of two face sequences adjacent to each other in terms of time may be found and the two face sequences may be joined into a single face sequence if the correlation is high. That is, a segment from the start of the section on the front side to the end of the section on the back side is adopted as one joined section and the segments are joined along with the auxiliary information. The representative pattern may be that of one of the face sequences.

The determination of the similarity of face sequences and the joining thereof are carried out successively with regard to all mutually adjacent face sequences and a plurality of similar face sequences are combined into a single face sequence. However, a set of face sequences in which the video intervals corresponding to the face sequences exceed a prescribed length of time is not used as a candidate for joining of face sequences. Further, in a case where a plurality of persons appears in video, there are instances where video intervals overlap in a plurality of face sequences. In such a case, however, the persons corresponding to the respective face sequences are regarded as separate persons and therefore these face sequences are not used as candidates for joining of face sequences.

Figure 7:
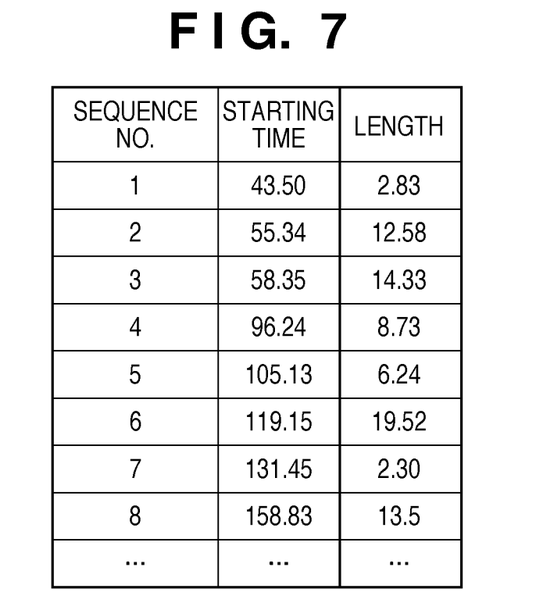
FIG. 7 is a diagram illustrating an example of auxiliary information obtained by recording information concerning face sequences.

FIG. 7 is a diagram illustrating an example of auxiliary information obtained by recording information concerning face sequences. Information regarding each face sequence detected has been recorded in this data.

The first column is a column of sequence numbers, which are indices; the second column is a column of starting times, which indicate numbers of seconds from the beginning of the moving image data; and the third column is a column of lengths, which indicate continuation times of the face sequences. It should be noted that in a case where the face detecting unit can identify that a person is the same person or can identify who a person is, a person ID may also be recorded together with the above.

Processing for Extracting a Representative Frame Image

A representative frame extracting unit 2030 extracts one or a plurality of frames, which well represent the content of a prescribed moving image interval, from this interval. The representative frame extracting unit 2030 is constituted by a face sequence information memory 2031, a representative frame extraction interval deciding unit 2032 and a representative frame extraction position deciding unit 2033. The face sequence information memory 2031 stores face sequence data that has been generated by the face sequence generating unit 2020.

Figure 8:
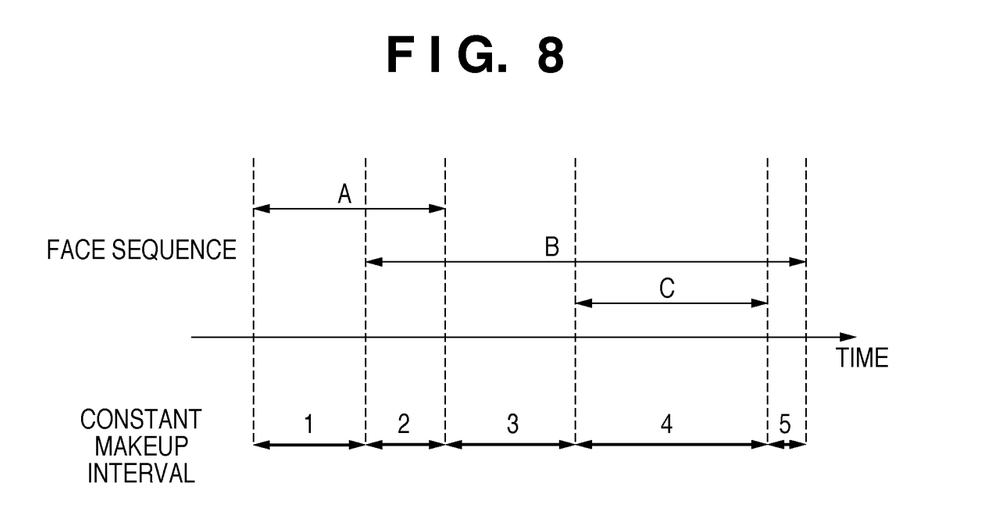
FIG. 8 is a diagram illustrating the relationship between face sequences and time intervals that are targets for extraction of a representative frame image.

FIG. 8 is a diagram illustrating the relationship between face sequences and time intervals that are targets for extraction of a representative frame image. In the range of time shown in FIG. 8, three face sequences A to C are detected and there is a time period over which face sequences A and B overlap and a time period over which face sequences B and C overlap. Under such conditions, five time intervals 1 to 5 are set as time intervals that are targets for extraction of representative frame images. In other words, a time interval in which the combination of persons that appear is constant is selected as a time interval that is a target for extraction of a representative frame image. Processing for selecting this time interval will now be described in detail.

Figure 9:
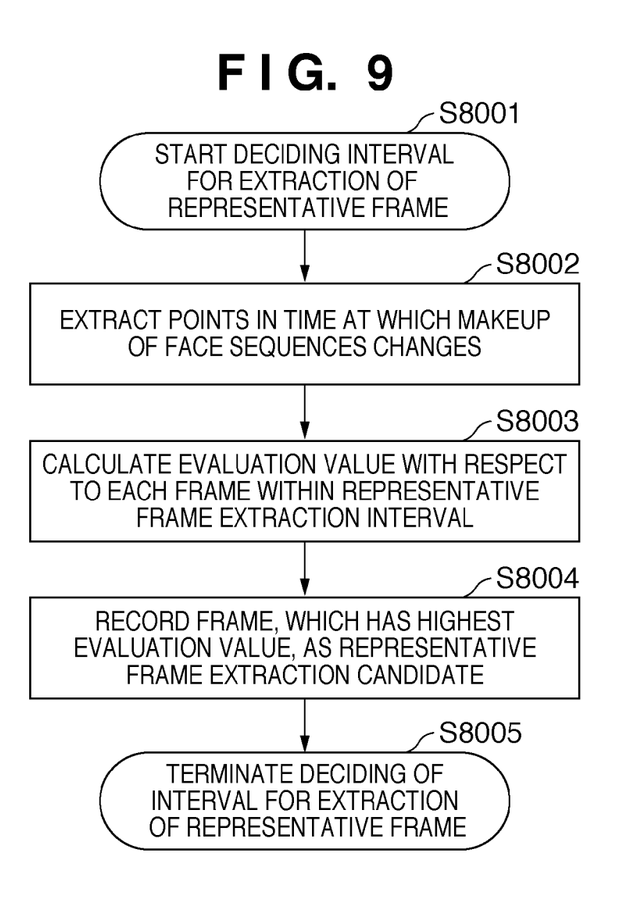
FIG. 9 is a flowchart for selecting a time interval that is a target for extraction of a representative frame image.

FIG. 9 is a flowchart for selecting a time interval that is a target for extraction of a representative frame image.

Processing starts in step S8001. In step S8002, points in time at which the makeup of face sequences changes are found. The results of finding these points in time for the three face sequences shown in FIG. 8 are the dashed lines perpendicular to the time axis in FIG. 8. In other words, the starting time and end time of each face sequence of one or more sequences are timings at which the time axis is split. Each time interval is one in which the makeup of face sequences (the combination of persons that appear) is constant. Such a time interval will be referred to as a "constant makeup interval" below. In FIG. 8, five constant makeup intervals are selected.

For each constant makeup interval, an evaluation value is calculated based upon a prescribed evaluation rule (standard for extraction) with regard to a frame image within the interval in step S8003. Although various methods of making such a calculation are conceivable, a face-image evaluation unit for evaluating a face image per se will be used as one example. Another method is one that uses position of a face within a frame or a saturation or hue distribution within the frame, or the like. A method that uses a mixture of these is also conceivable. Further, the overall correlation of images of adjacent frames may be obtained and an adjustment may be made such that the evaluation value rises at a location where motion is not sudden. A specific example of the calculation method will be described below. In the description that follows, the evaluation formula is one such that the more suitable a frame image is as a representative frame image, the larger the evaluation value.

With regard to a subject for which the evaluation value is high in a main-face determination unit (not shown), a face-state determination unit (not shown) disposed in the representative frame extraction interval deciding unit 2032 calculates an evaluation value indicating whether or not the face image is a face image that well represents the subject. For example, the face-state determination unit derives an evaluation value taking note of face orientation, open/closed state of the eyes, facial expression, shadows due to illumination and whether part of the face is hidden by another object. With regard to face orientation and facial expression, orientation and expression learning data is applied to a face image pattern and implementation is possible by obtaining the weighting and threshold value of the above-mentioned neural network.

In order to determine the state of a face accurately, the existence of parts of the face such as the eyes, mouth and nose in a face image is considered important. That is, the fact that a face is facing forward is better for expressing the features of the face more accurately in comparison with a case where the face is facing sideways or is tilted. Accordingly, the face-state determination unit 322 is adapted to detect the face orientation of each face image in a face sequence. For example, the face-state determination unit 322 has a plurality of face discriminators having the same structure as that of the face discriminator based upon the above-described neural network. However, parameters for discrimination in each face discriminator are tuned and set by sample learning for every face orientation. The face orientation corresponding to the face discriminator having the highest output, i.e., the face discriminator for which the likelihood is highest, from among the plurality of face discriminators is output and the evaluation that is high in a case where the face is facing forward is applied.

Further, by way of example, it may be arranged so that parts such as the eyes, mouth and nose are searched individually from a face image and whether or not each exists is output as result of analysis. Further, it may be arranged so that whether eyes or open or closed is determined and output as result of analysis. Further, in a case where state of illumination of a face is good and the skin portion has been captured brightly overall, an evaluation value that is higher than in a case where the face is in partial shadow is applied. With regard to shadow or concealment, a face pattern can be modeled by a method referred to as "Eigenface" as in Reference Document 3 and an approximate difference between a face image approximated by model parameters and the face image of the original image can be evaluated to thereby obtain a shadow or concealed region. Since some of the model parameters include an illumination component of the face, the direction and intensity of illumination can be found from the intensity of this component.

Reference Document 3: M. Turk and A. Pentland, "Eigenfaces for recognition", Journal of Cognitive Neuroscience 3(1): 71-86, 1991

In step S8004, the frame having the highest evaluation value is selected as the representative frame from each constant makeup interval and the selected frame is recorded. This is referred to as a "representative frame candidate position" below. With regard to each constant makeup frame for which there is a representative frame candidate position, the representative frame image candidate is extracted by this processing.

After the selection of time intervals that are targets for extraction of a representative frame and, moreover, after extraction of the representative frame image candidate in each time interval, the representative frame image is extracted by the processing described below.

The representative frame extraction position deciding unit 2033 decides the final representative frames based upon the information extracted by the representative frame extraction interval deciding unit 2032. In a case where there is a plurality of appearing persons who are subjects, prime importance is placed upon information to the effect that these persons are appearing together. This is effective in a case where a domestic event or happening is adopted as the main target of shooting.

In this case, it is important that representative frame candidates, which have been obtained from time intervals in which a plurality of persons appear simultaneously, be included in the final representative frames. The representative frame candidates of time intervals 2 and 4 in FIG. 8 are adopted as the final representative frame candidates. Further, in a case where there is a representative frame candidate having a high evaluation value even in a constant makeup interval other than the above, this frame is added to the final representative frames. Further, in a case where constant makeup intervals having the same appearing persons exist, the representative frame candidate having the highest evaluation value is selected. It should be noted that in a case where the evaluation formula is one such that the more suitable a frame image is as a representative frame image, the smaller the evaluation value, the frame image having the smallest evaluation value is selected.

Thus, in a case where a time interval in which a plurality of persons appears exists in moving image data, it is always possible to extract a representative frame image in the time interval.

It should be noted that in a case where a list display is the objective, a small number of representative frame images is desirable. In a case where index information used in a search is the objective, it is better to have a large number of representative frame images. Since the number of representative frame images required thus differs depending upon the objective, evaluation values may be stored together in a storage unit beforehand and, by leaving the number of representative frame images designated by the user, the required number of representative frames can be selected in order of decreasing evaluation value.

Further, data format when result of extraction of representative frame images is stored in a storage unit can be any data format as long as analysis by the system is possible. For example, expression may be made in a text format or in an XML (Extensible Markup Language) format that defines its own DTD (Document Type Definition).

Figure 10:
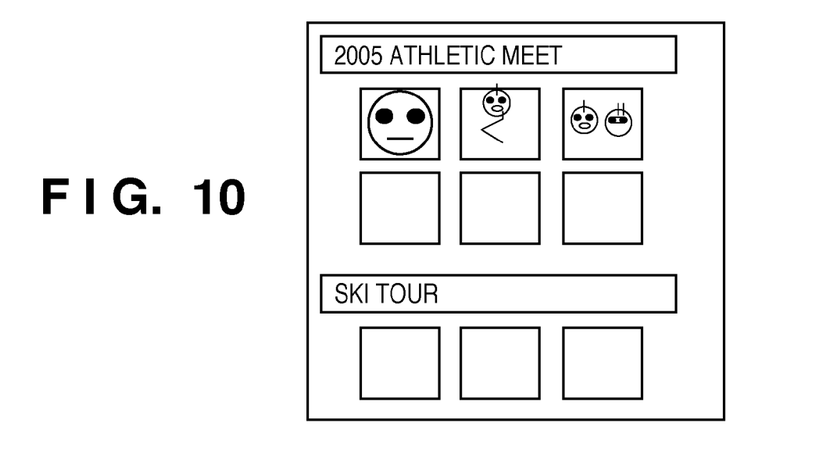
FIG. 10 is a diagram illustrating an example of output of a list of representative frame images

FIG. 10 is a diagram illustrating an example of output of a list of representative frame images. It may be arranged so that the list of extracted representative frame images is displayed on the monitor 1008, or it may be arranged so that the list is printed out by the printer 1009.

In accordance with the information processing apparatus according to the first embodiment described above, face sequences are detected from moving image data. Time intervals (constant makeup intervals) in which the combination of appearing persons is constant are selected based upon the time intervals of a plurality of selected face sequences. By extracting a representative frame image with regard to each constant makeup interval, more appropriate representative frame images can be extracted.

In particular, by preferentially extracting a representative frame image from a constant makeup interval in which a plurality of face sequences overlap along the time axis, more appropriate and a smaller number of representative frame images can be extracted.

Second Embodiment

Described in a second embodiment is a method of extracting a representative frame image by utilizing a "composition template" for designating the composition of a frame image.

More specifically, when a time interval that is a target for extraction of a representative frame is selected, it is possible to select a representative frame extraction interval, which may possibly possess an appropriate representative frame, by utilizing a designation of a main subject and a designation of an appropriate shooting composition. It should be noted that with regard to units other than the representative frame extraction interval deciding unit 2032, the configuration and content of processing are similar to those of the first embodiment and need not be described again.

Figure 11:
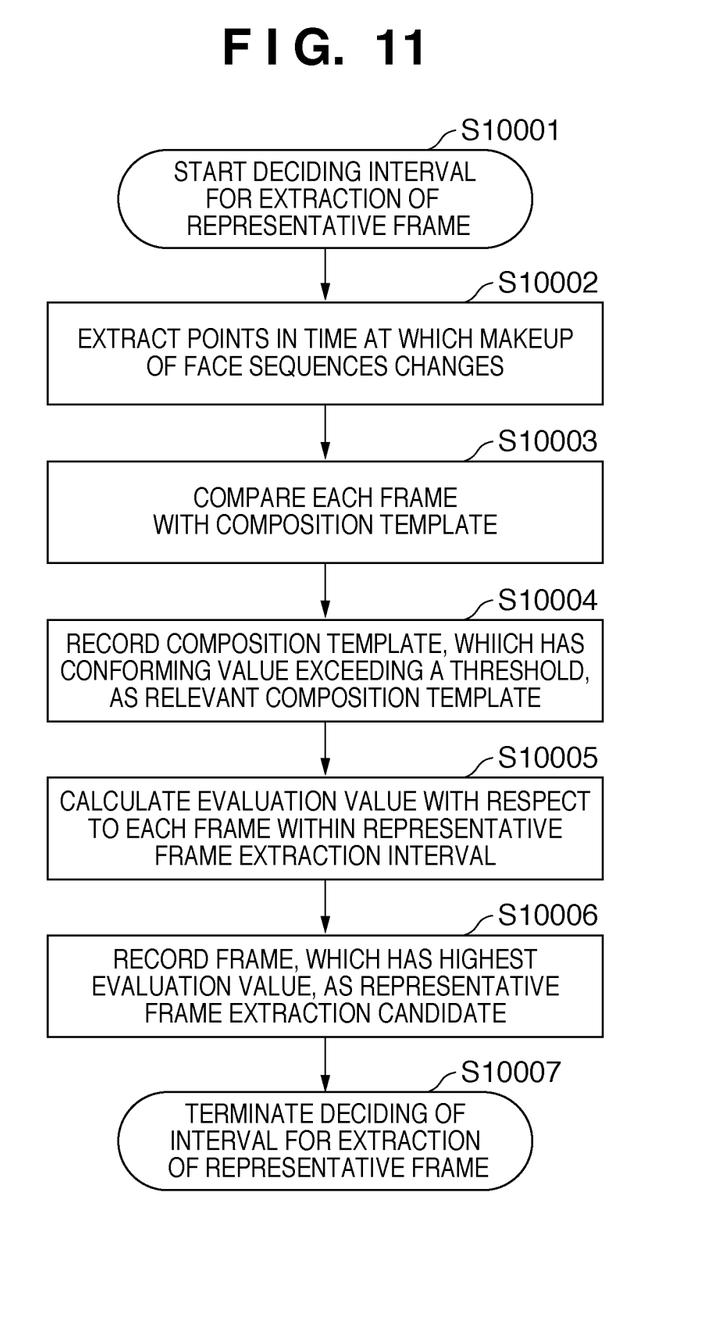
FIG. 11 is a flowchart for selecting a time interval that is a target for extraction of a representative frame image.

FIG. 11 is a flowchart for selecting a time interval that is a target for extraction of a representative frame image.

Processing starts in step S10001. In step S10002, points in time at which the makeup of face sequences changes are found. The results of finding these points in time for the three face sequences shown in FIG. 8 are the dashed lines perpendicular to the time axis in FIG. 8. Each time interval is one in which the makeup of face sequences (the combination of persons that appear) is constant. Such a time interval will be referred to as a "constant makeup interval" below. In FIG. 8, five constant makeup intervals are selected.

In step S10003, a composition determination is performed to determine whether each frame within a constant makeup interval is a matching frame when compared with a composition template designated beforehand.

Figure 12:
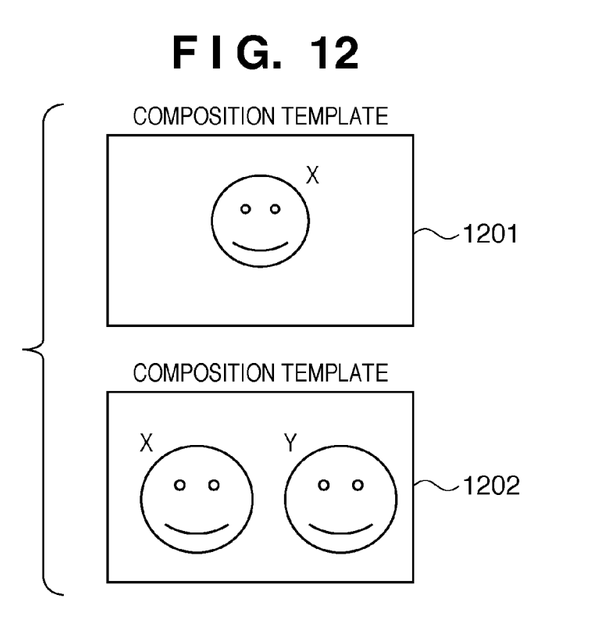
FIG. 12 is a diagram illustrating examples of makeup templates.

FIG. 12 is a diagram illustrating examples of makeup templates. A composition template indicates a typical pattern of the composition of a frame image. A composition template 1201 (Template No. 1) indicates a composition in which one person (X) having a face which is large to a certain extent appears for a fixed period of time or longer. On the other hand, a composition template 1202 (Template No. 2) indicates a composition in which two persons (X and Y) both having faces which are large to a certain extent and which are of the same size appear for a fixed period of time or longer. These are merely examples and there may be other composition templates such as of action and motion of specific patterns.

By thus utilizing a composition template, whether or not individual frame images include a frame image that is appropriate as a representative frame image is investigated. As a result, selection of the face of a main subject is performed simultaneously together with processing described later. By making a comparison with the composition template and adopting face position, size and captured time, or the like, as a standard, the degree to which the standard is satisfied is converted to a numerical value and this value is adopted as a conforming value.

In step S10004, the composition template having the largest conforming value is selected with regard to each constant makeup interval. In a case where this conforming value exceeds a certain threshold value, the template is regarded as the relevant composition template and this composition template number is recorded.

Figure 13:
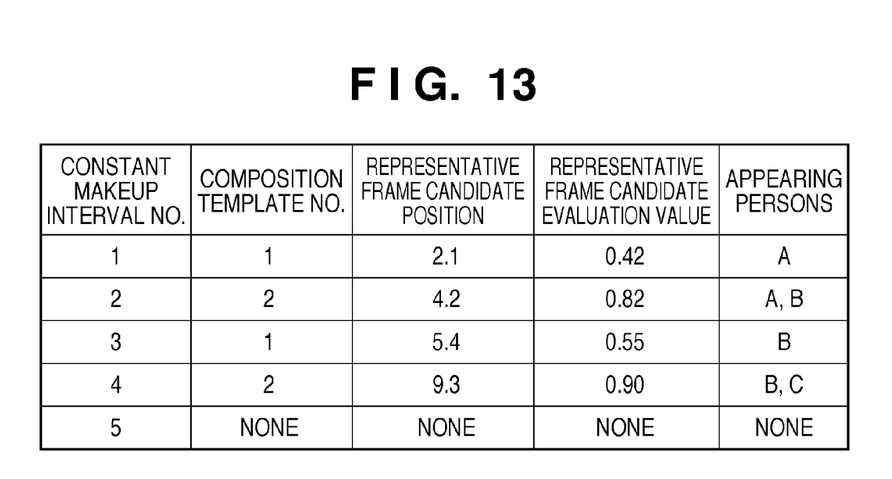
FIG. 13 is a diagram illustrating results obtained when processing for deciding a representative frame extraction interval is applied to the face sequences of FIG. 7.

FIG. 13 is a diagram illustrating results obtained when processing for deciding a representative frame extraction interval is applied to the face sequences of FIG. 7.

The first column is a column of the constant composition interval numbers shown in FIG. 8, and the second column is a column of template numbers that have been determined to be conforming. With regard to the constant makeup interval 5, the conforming value of the composition template did not exceed the threshold value and therefore this composition template number is "NONE". The fifth column in FIG. 13 is a column of persons that appear in each constant makeup interval. This corresponds to combination of face sequences in each interval.

With respect to a constant makeup interval for which a composition template number has been decided, the evaluation value is calculated in step S10005 regarding the frame of the moving image within this interval. Although various methods of calculation are conceivable, the above-mentioned face-image evaluation unit for evaluating a face image per se will be used as one example. Another method is one that uses position of a face within a frame, a saturation or hue distribution within the frame or the conforming value of the composition template mentioned above. A method that uses a mixture of these is also conceivable. Further, the overall correlation of images of adjacent frames may be obtained and an adjustment may be made such that the evaluation value rises at a location where motion is not sudden.

With respect to a constant makeup interval for which there is a composition template number, the frame having the highest evaluation value is selected and recorded in step S10006 as a representative frame. The third column in FIG. 13 is a column of positions of frames selected within a moving image (numbers of seconds from the beginning of the moving image data). These positions are referred to as "representative frame candidate positions". The fourth column is a column of evaluation values of the representative frame candidates. As a result, with regard to a constant makeup interval for which there is a representative frame candidate, this representative frame candidate is extracted.

After the representative frame candidate mentioned above is extracted, the representative frame image is extracted by the processing described below.

The representative frame extraction position deciding unit 2033 decides the final representative frames based upon the information recorded as shown in FIG. 13. In a case where there is a plurality of appearing persons who are subjects, prime importance is placed upon information to the effect that these persons are appearing together. This is effective in a case where a domestic event or happening is adopted as the main target of shooting.

In this case, it is important that representative frame candidates, which have been obtained from time intervals in which a plurality of persons appear simultaneously, be included in the final representative frames. The representative frame candidates of time intervals 2 and 4 under the conditions shown in FIG. 8 are adopted as the final representative frame candidates. Further, in a case where there is a representative frame candidate having a high evaluation value even in a constant makeup interval other than the above, this frame is added to the final representative frames. Further, in a case where constant makeup intervals having the same appearing persons exist, the representative frame candidate having the highest evaluation value is selected.

Thus, in a case where a time interval in which a plurality of persons appears exists in moving image data, it is always possible to extract a representative frame image in the time interval. In particular, by extracting a frame image having a composition indicated by a composition template designated in advance, a more appropriate representative frame image can be extracted.

Third Embodiment

Described in a third embodiment is an example in which representative frame images of a reduced number are extracted based upon the information shown in FIG. 13. More specifically, a method of extracting only one representative frame image with respect to a combination of the same persons will be described. It should be noted that with regard to units other than the representative frame extraction position deciding unit 2033, the configuration and content of processing are similar to those of the second embodiment and need not be described again.

Figure 14:
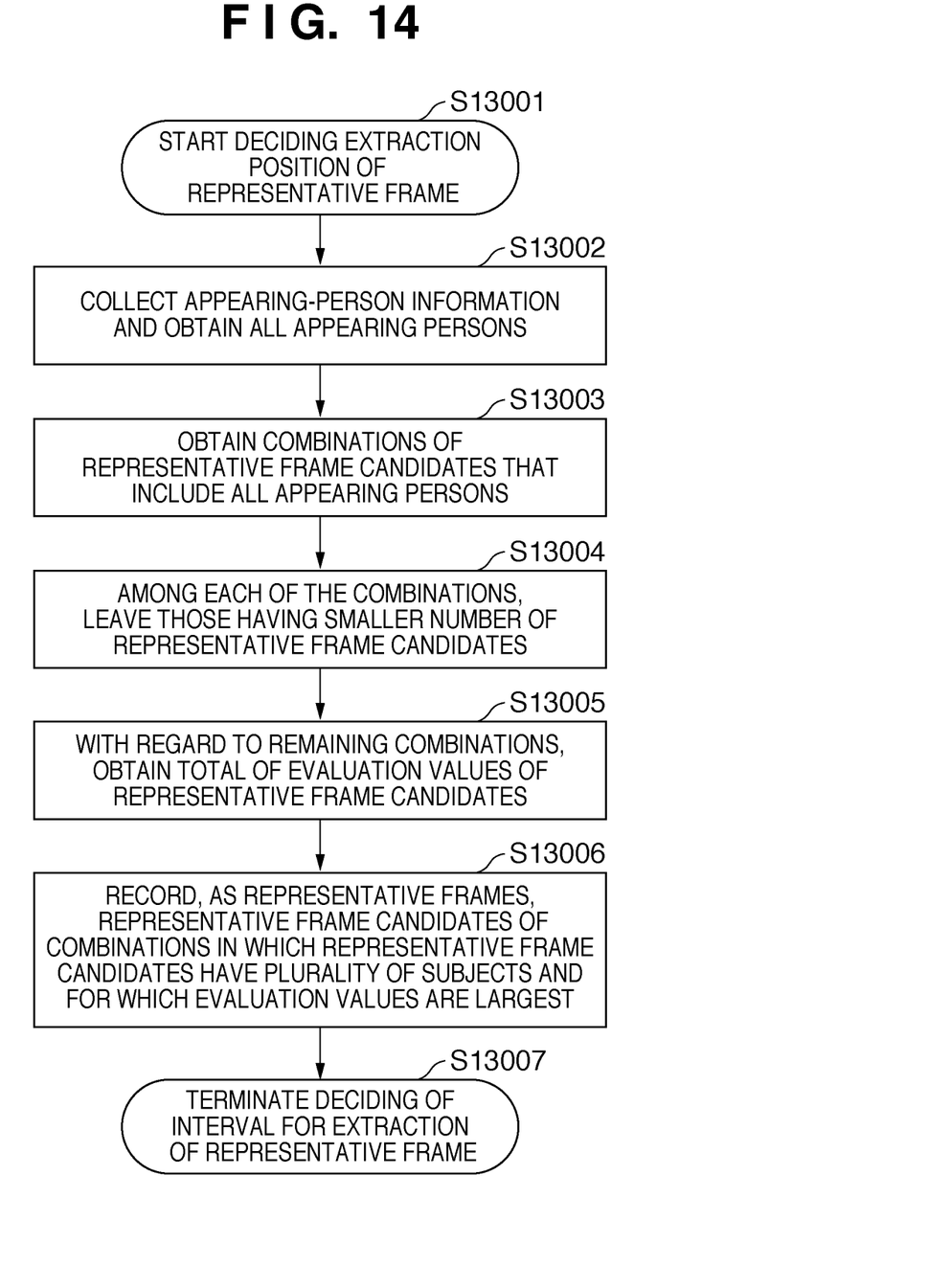
FIG. 14 is a flowchart illustrating operation of a unit for deciding a representative frame extraction position.

FIG. 14 is a flowchart illustrating operation of the representative frame extraction position deciding unit 2033.

Processing starts in step S13001. In step S13002, information regarding appearing persons who are subjects that appear in representative frame candidates is acquired based upon the results of FIG. 13. Here information indicating that all of the persons that appear in the moving image data are A, B and C is obtained. With regard to the specifying of persons, this may just as well be performed using the similarity of face images per se or a method of discriminating or identifying individuals.

In step S13003, combinations of representative frame candidates that include the appearing persons acquired in step S13002 are derived.

Figure 15:
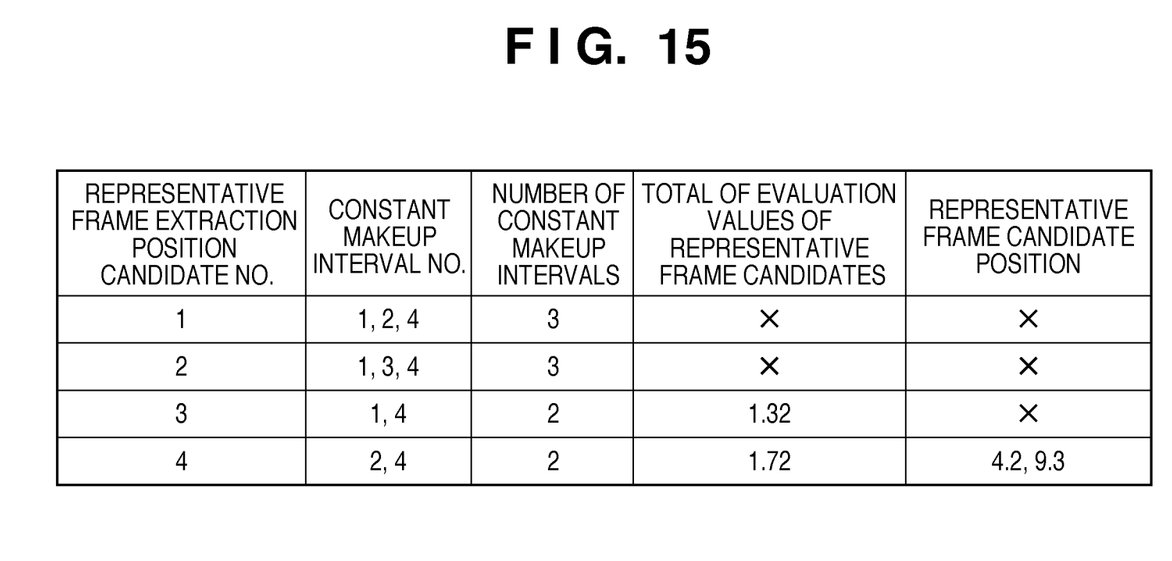
FIG. 15 is a diagram illustrating results of processing executed in step S13003.

FIG. 15 is a diagram illustrating results of processing executed in a step S13003. The first column is a column of the combination numbers of combinations of representative frame image extraction positions (representative frame extraction position candidate numbers). It will be understood from FIG. 13 that there are four combinations, namely "A only", "A and B only", "B only" and "B and C" only. The second column in FIG. 15 is a column of the content of these combinations. This is a set of the constant makeup interval numbers.

In step S13004, the combinations of representative frame image extraction positions are searched to find those having small numbers of constant makeup intervals and these are left as candidates for extraction of a representative frame image. The third column in FIG. 15 is a column of the numbers of constant makeup intervals. Here Representative Frame Extraction Position Candidate No. 3 and Representative Frame Extraction Position Candidate No. 4, which have the smallest number (two) of constant makeup intervals, are left as candidates.

In step S13005, the totals of the evaluation values of the representative frame candidates among the representative frame extraction position candidates that have been left are calculated and these totals are adopted as the evaluation values of the representative frame extraction position candidates. Among the representative frame extraction position candidates, those for which the numbers of constant makeup intervals are not the smallest require no such calculation and these are marked "x" in FIG. 15.

In step S13006, representative frame candidates in which a plurality of subjects exist and, moreover, for which the evaluation values of the representative frame extraction position candidates are largest are selected as the final representative frames. The fifth column in FIG. 15 is a column that indicates the positions of the representative frames finally selected.

Thus, in a case where time intervals in which a plurality of persons appears exist in moving image data, it is possible to extract more appropriate representative frame images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-290322, filed Nov. 12, 2008, which is hereby incorporated by reference herein in its entirety.

What is claimed is:

1. An information processing apparatus comprising:
    an input unit configured to input moving image data that includes a plurality of frame images arranged in a time series;
    a detecting unit configured to detect a frame image, which includes at least one object, from the moving image data that has been input;
    a tracking unit configured to track, for each of the at least one object, a frame image, which includes an object similar to the object included in the frame image detected by said detecting unit, from frame images after the detected frame image;
    a storage unit configured to decide upon successive frame images, which have been tracked by said tracking unit, as an image sequence and to store the image sequence in association with starting time and end time thereof, where a plurality of image sequences corresponding to different objects can be overlapped with each other along a time axis;
    a splitting unit configured to split the moving image data into a plurality of time intervals by splitting the moving image data at the respective starting time and end time of the plurality of image sequences that have been stored in said storage unit, so that each point at which a configuration of objects is changed in the moving image data is a splitting point;
    an extracting unit configured to extract a candidate of a representative frame image from each of the plurality of time intervals obtained by the splitting unit; and
    a selection unit configured to select a representative frame image from the candidates of the representative frame image, wherein when (a) a plurality of image sequences corresponding to different objects overlap each other along the time axis and (b) there is a candidate of the representative frame image extracted from a time interval which is common to the plurality of overlapped image sequences, said selection unit selects the candidate of the representative frame image extracted from the time interval which is common to the plurality of overlapped image sequences as the representative frame image.

2. The apparatus according to claim 1, wherein said extracting unit calculates, based upon a prescribed evaluation rule, an evaluation value of each of the frame images included in each of the plurality of time intervals, and extracts a frame image, for which the evaluation value is maximum or minimum, as the candidate of the representative frame image.

3. The apparatus according to claim 1, further comprising a composition determination unit configured to determine whether a frame image included in each of the plurality of time intervals is a frame image corresponding to any of one or more composition templates set in advance,
    wherein said extracting unit extracts the candidate of the representative frame image only from a time interval that includes frame images determined by said composition determination unit to be images corresponding to any of the one or more composition templates.

4. The apparatus according to claim 1, wherein the object of a prescribed type is a face of a person,
    wherein said detecting unit detects a face image, which is included in a frame image, person by person, and
    wherein said extracting unit extracts the representative frame image only from a time interval in which there is a combination of persons who differ from one another.

5. A method of controlling an information processing apparatus for extracting one or more representative frame images from moving image data that includes a plurality of frame images arranged in a time series, said method comprising:
    an input step of inputting moving image data;
    a detecting step of detecting a frame image, which includes at least one object, from the moving image data that has been input;
    a tracking step of tracking, for each of the at least one object, a frame image, which includes an object similar to the object included in the frame image detected at said detecting step, from frame images after the detected frame image;
    a storage step of deciding upon successive frame images, which have been tracked at said tracking step, as an image sequence and storing the image sequence in a storage unit in association with starting time and end time thereof, where a plurality of image sequences corresponding to different objects can be overlapped with each other along a time axis;
    a splitting step of splitting the moving image data into a plurality of time intervals by splitting the moving image data at the respective starting time and end time of the plurality of image sequences that have been stored in the storage unit, so that each point at which a configuration of objects is changed in the moving image data is a splitting point;
    an extracting step of extracting a candidate of a representative frame image from each of the plurality of time intervals obtained by the splitting step; and
    a selecting step of selecting a representative frame image from the candidates of the representative frame image, wherein when (a) a plurality of image sequences corresponding to different objects overlap each other along the time axis and (b) there is a candidate of the representative frame image extracted from a time interval which is common to the plurality of overlapped image sequences, said selecting step selects the candidate of the representative frame image extracted from the time interval which is common to the plurality of overlapped image sequences as the representative frame image.

6. A non-transitory computer-readable medium storing a computer-executable program for causing a computer to function as each of the units of the information processing apparatus set forth in claim 1.

* * * * *